United States Patent
Zhou et al.

(10) Patent No.: US 7,902,723 B2
(45) Date of Patent: Mar. 8, 2011

(54) SCREW THREAD DRIVING POLYHEDRAL ULTRASONIC MOTOR

(75) Inventors: Tieying Zhou, Beijing (CN); Cunyue Lu, Beijing (CN); Yu Chen, Beijing (CN); Deyong Fu, Beijing (CN); Xiaoping Hu, Shenzhen (CN); Yi Li, Shenzhen (CN); Bin Tian, Shenzhen (CN); Zhengping Wang, Shenzhen (CN)

(73) Assignee: Tsinghua University, Beijing (CN)

( * ) Notice: Subject to any disclaimer, the term of this patent is extended or adjusted under 35 U.S.C. 154(b) by 363 days.

(21) Appl. No.: 12/094,029

(22) PCT Filed: Nov. 16, 2006

(86) PCT No.: PCT/CN2006/003088
§ 371 (c)(1),
(2), (4) Date: May 16, 2008

(87) PCT Pub. No.: WO2007/056952
PCT Pub. Date: May 24, 2007

(65) Prior Publication Data
US 2008/0238254 A1    Oct. 2, 2008

(30) Foreign Application Priority Data
Nov. 18, 2005  (CN) .......................... 2005 1 0114849

(51) Int. Cl.
*H02N 2/00* (2006.01)
(52) U.S. Cl. ........... 310/323.04; 310/323.06; 310/323.17

(58) Field of Classification Search ........ 310/323.01–323.06, 323.17, 369
See application file for complete search history.

(56) References Cited

U.S. PATENT DOCUMENTS

| | | | | |
|---|---|---|---|---|
| 4,087,715 | A * | 5/1978 | Myer | 310/317 |
| 4,630,941 | A * | 12/1986 | Chainer et al. | 384/1 |
| 4,912,351 | A * | 3/1990 | Takata et al. | 310/323.16 |
| 5,453,653 | A * | 9/1995 | Zumeris | 310/323.16 |
| 7,170,214 | B2 * | 1/2007 | Henderson et al. | 310/323.02 |
| 7,312,559 | B2 * | 12/2007 | Lee et al. | 310/367 |
| 2006/0049720 | A1 * | 3/2006 | Henderson et al. | 310/328 |
| 2007/0242941 | A1 * | 10/2007 | Hu et al. | 396/79 |
| 2009/0261690 | A1 * | 10/2009 | Mashimo et al. | 310/323.03 |

FOREIGN PATENT DOCUMENTS

| | | | |
|---|---|---|---|
| CN | 1874134 A | * | 12/2006 |
| JP | 1-255478 A | * | 10/1989 |
| JP | 2004112107 | | 4/2004 |
| WO | 2004052049 | | 6/2004 |

OTHER PUBLICATIONS

International Search Report from PCT/CN06/000869 dated Jul. 6, 2006.

* cited by examiner

*Primary Examiner* — Thomas M Dougherty
(74) *Attorney, Agent, or Firm* — Nutter McClennen & Fish LLP; Thomas J. Engellenner

(57) ABSTRACT

A screw thread driving polyhedral ultrasonic motor includes a stator, a rotor and multiple piezoelectric plates being bonded to the stator or the rotor. The stator and the rotor have screw threads matched with each other. The stator and the rotor are connected via the screw threads.

11 Claims, 10 Drawing Sheets

(1)

(2)

SCREW THREAD DRIVING POLYHEDRAL ULTRASONIC MOTOR

FIELD OF THE INVENTION

The present invention relates to the field of ultrasonic application, and more particularly to a configuration design for a screw thread driving system of a polyhedral tube-shaped ultrasonic motor.

BACKGROUND OF THE INVENTION

A piezoelectric ultrasonic motor is a driving mechanism utilizing converse piezoelectric effect of piezoelectric materials and made of a specific configuration, and it generally comprises functional components such as piezoelectric ceramic, stators, rotors, pre-pressure mechanism and transmission mechanism. It utilizes converse piezoelectric effect of piezoelectric ceramic so as to generate ultrasonic vibration on surfaces of the stators and drive the rotors via force of friction between the stators and the rotors. The ultrasonic motor has following advantages over ordinary electromagnetic motors:

1. Low rotating speed, high torque, and the load can be driven directly without retarding mechanisms.
2. Small volume, flexible configuration, and more particularly, the power to volume ratio is 3-10 times of the electromagnetic motors.
3. Quick response to both start and stop, and more particularly, the response time is less than 1 ms.
4. Neither causing electromagnetic interference nor being interfered by electromagnetic disturbance.
5. Having self-hold torque, no gear gap, and can be used for precision positioning.
6. Quiet operation, no noise.

FIG. 1 and FIG. 2 show a piezoelectric ultrasonic motor in prior art.

FIG. 1 is a schematic diagram of configuration of a polyhedral tube ultrasonic motor, wherein FIG. 1 (1) shows the configuration of its main part, which includes a vibrator comprising a stator 13 and electrostriction elements (piezoelectric ceramic plates) 11, 12 bonded to surfaces of the stator 13. They can be multiple electrodes divided from a piezoelectric tube, or they can also be formed by bonding the multiple piezoelectric plates to the external surface of the piezoelectric tube (the polyhedral tube is made of metal materials or surfaces contacted with the piezoelectric plates are metal electric conductive layers). The internal surface of the vibrator is a smooth torus. The rotor uses a tube of a ring 15 with an opening 14. The rotor is installed on the internal surface of the vibrator, working under the driving principle of travelling wave ultrasonic motors, when a corresponding driving voltage is added on the piezoelectric ceramic plates, the travelling wave generated on the internal surface of the vibrator can rotate with respect to the ring 15. The opening on the ring 15 is set for the purpose of increasing pre-pressure to the contact surface between the stator and the rotor.

The motor is intended to apply to a zoom system of lens. FIG. 1 (2) shows the configuration of a screw thread transmission system of such application, where screw threads are carved on the front end of a drawtube 15 (corresponding to said rotor), which is immovable in the apparatus. Reference sign 13 refers to a polyhedral tube-shaped ring, whose external surface is bonded with piezoelectric ceramic plates 11, 12 (corresponding to said vibrator). A front bracket 16 is bonded to the front end of the polyhedral tube 13 so as to be integrated with the piezoelectric ceramic plates 11, 12. The front end of the front bracket 16 is carved with screw threads which are coupled with those on the front end of the drawtube 15. The group of zoom lenses is installed on the front bracket 16 via a fastening ring, and screw threads are formed at the rear end of the bracket which is coupled with the screw threads on the left end of the drawtube 15. The vibrator is bonded to the end of the front bracket, and the internal surface of the vibrator is in contact with the external surface of the drawtube 15. When the piezoelectric ceramic is excited by an electric signal, the piezoelectric plates 11, 12 and the polyhedron 13 are driven to rotate with respect to the drawtube 15, and the front bracket 16 is also brought to rotate. Thus a torus driving is generated on the external surface of the drawtube. The left end of the drawtube is carved with screw threads so that the front bracket can move linearly along the axial direction as a result of the relative rotation of the screw threads between the front bracket and the front end of the drawtube. Zooming and focusing can be realized via the rectilinear movement, so the system above is called a screw thread transmission system. The piezoelectric exciting signal is introduced into the system via a connection switch.

FIG. 2 (1) is a schematic diagram of the configuration of an ultrasonic motor with conical axis output of a polyhedral tube, wherein the internal surface of a stator 21 has conical teeth 22, and a vibrator is formed by bonding piezoelectric ceramic plates 23 to the external surfaces of the stator 21, the conical body contacted with the conical teeth 22 is used as a rotor 24. FIG. 2 (2) is an assembly drawing of the configuration applied to a robot joint, where the vibrator is covered by a motor hood 27, front cover 25 and back cover 26 are provided via cushion 29 on its both ends, and both the front cover and back cover are connected with the motor hood 27 as a whole by fastening bolts 28. Such configuration directly transfers the vibration of the vibrator to the rotor.

The drawback of the configuration above is that the rotation is transformed into the rectilinear motion by other transmission mechanism (screw thread transmission or screw transmission) in actual practice.

SUMMARY OF THE INVENTION

The purpose of the present invention is to provide a screw threads driving system of a polyhedral tube-shaped ultrasonic motor that overcomes the drawbacks in the prior art so that it can have simple configuration. The relative movement between a stator and a rotor can be generated directly via the contact of screw threads, and the rotation can be transformed into the rectilinear motion without other transmission mechanism, which can make the application configuration more simple and compact, and is more suitable for the micromation. And it has a promising prospect in broad fields such as micro-machine and optical focusing and zooming.

The screw threads driving polyhedral ultrasonic motor provided by the present invention comprises a stator, a rotor and multiple piezoelectric ceramic plates bonded to the stator or the rotor as a whole, characterized in that, said stator has screw threads on the surface in contact with the rotor, and said rotor also has screw threads matching with those on the stator.

Said stator can be held on either or both ends. The external screw threads or internal screw threads of the stator and corresponding rotor can be formed on the whole or part of the tube (upper, middle or lower part).

Said piezoelectric ceramic plates can be bonded to the stator or the rotor so as to form the vibrator, the bonding surfaces between the piezoelectric ceramic plates and the stator or the rotor are polyhedral.

Said stator can be configured surrounding the rotor or being surrounded by the rotor.

The number of said piezoelectric ceramic plates is the multiple of 3 or 4; or 1, 2, 3 or any other integer which can generate in-plane bending travelling waves or standing waves with corresponding excitation.

The present invention has simple configuration; the stator and the rotor directly contact each other via the screw threads. The stator drives the rotor via the screw threads and no other transmission mechanism is needed, so it is more suitable for micromation, and has a promising prospect in broad fields such as micro-machine and optical focusing and zooming.

DETAILED DESCRIPTION OF PREFERRED EMBODIMENTS

Figure 1:
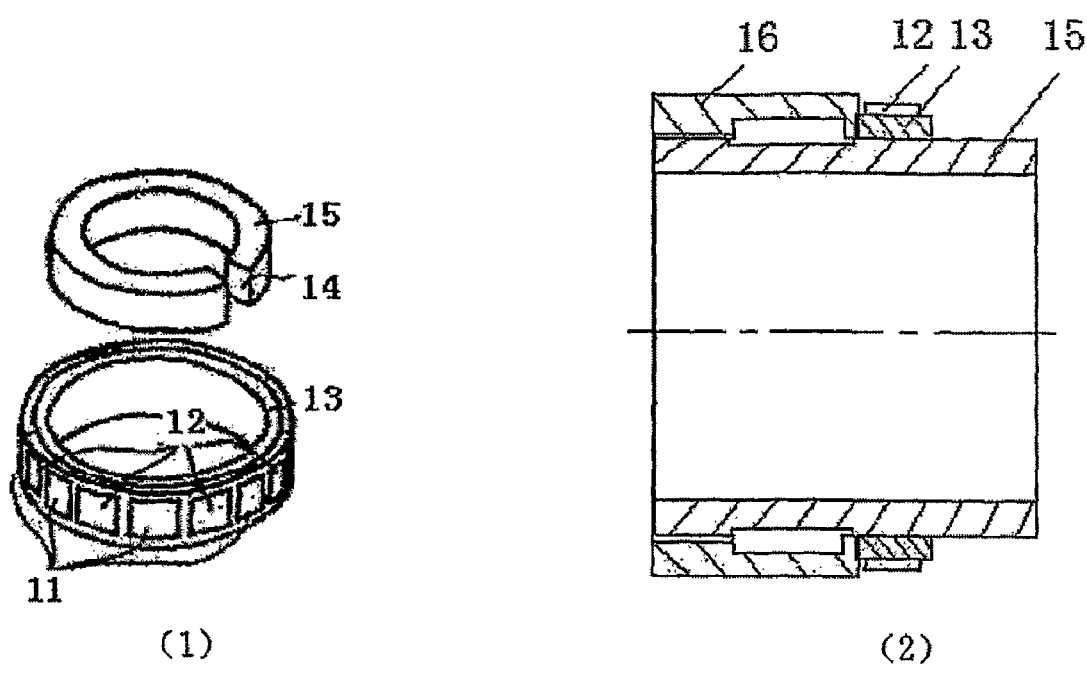
FIG. 1 is a schematic diagram of the configuration of a prior polyhedral tube ultrasonic motor, wherein FIG. 1 (1) shows the configuration of its core components, and FIG. 1 (2) is a schematic diagram structure sketch drawing of a screw thread transmission system utilizing the configuration.
Figure 2:
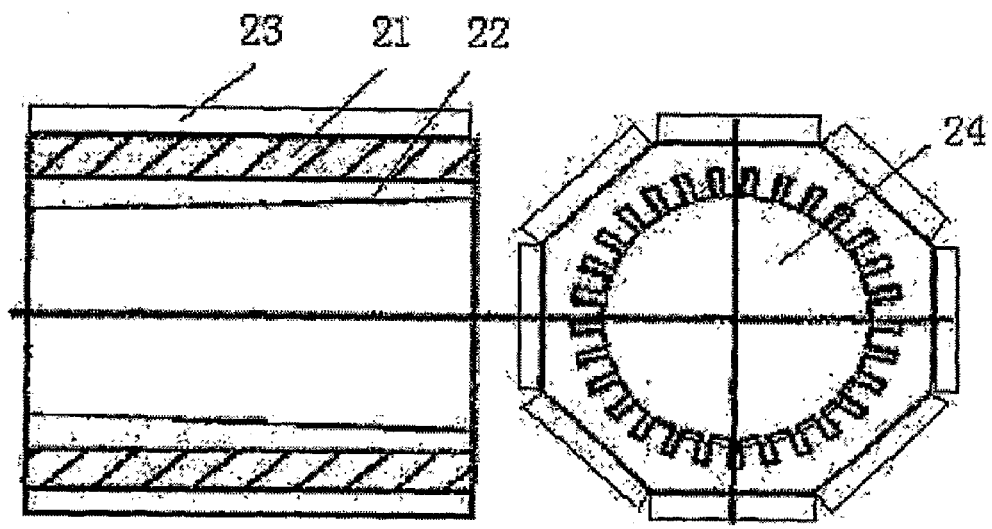
FIG. 2 is a schematic diagram of a prior ultrasonic motor with conical axis output of polyhedral tube, wherein FIG. 2 (1) shows the configuration of its core components, and FIG. 2 (2) is an assembly drawing of the configuration applied to the robot joint.
Figure 2:
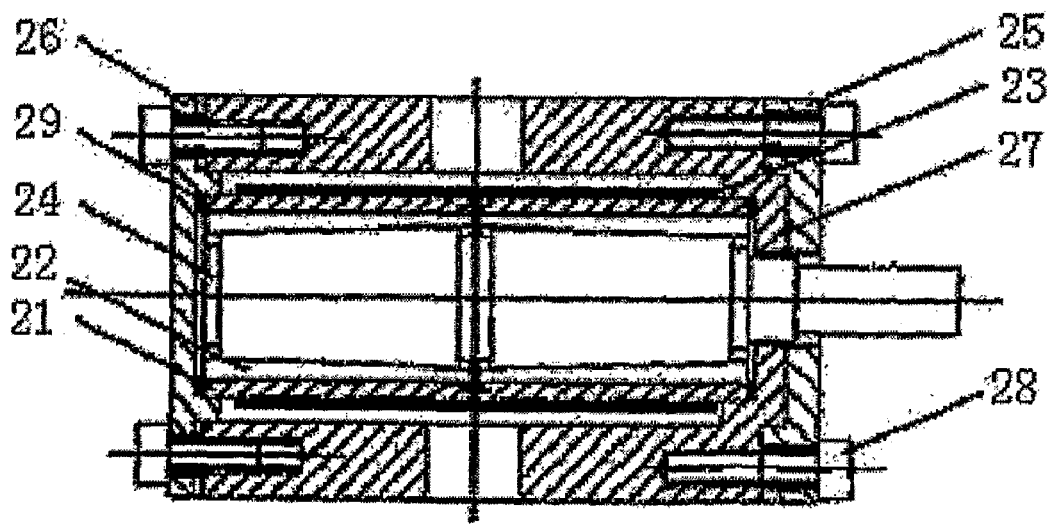
Figure 3:
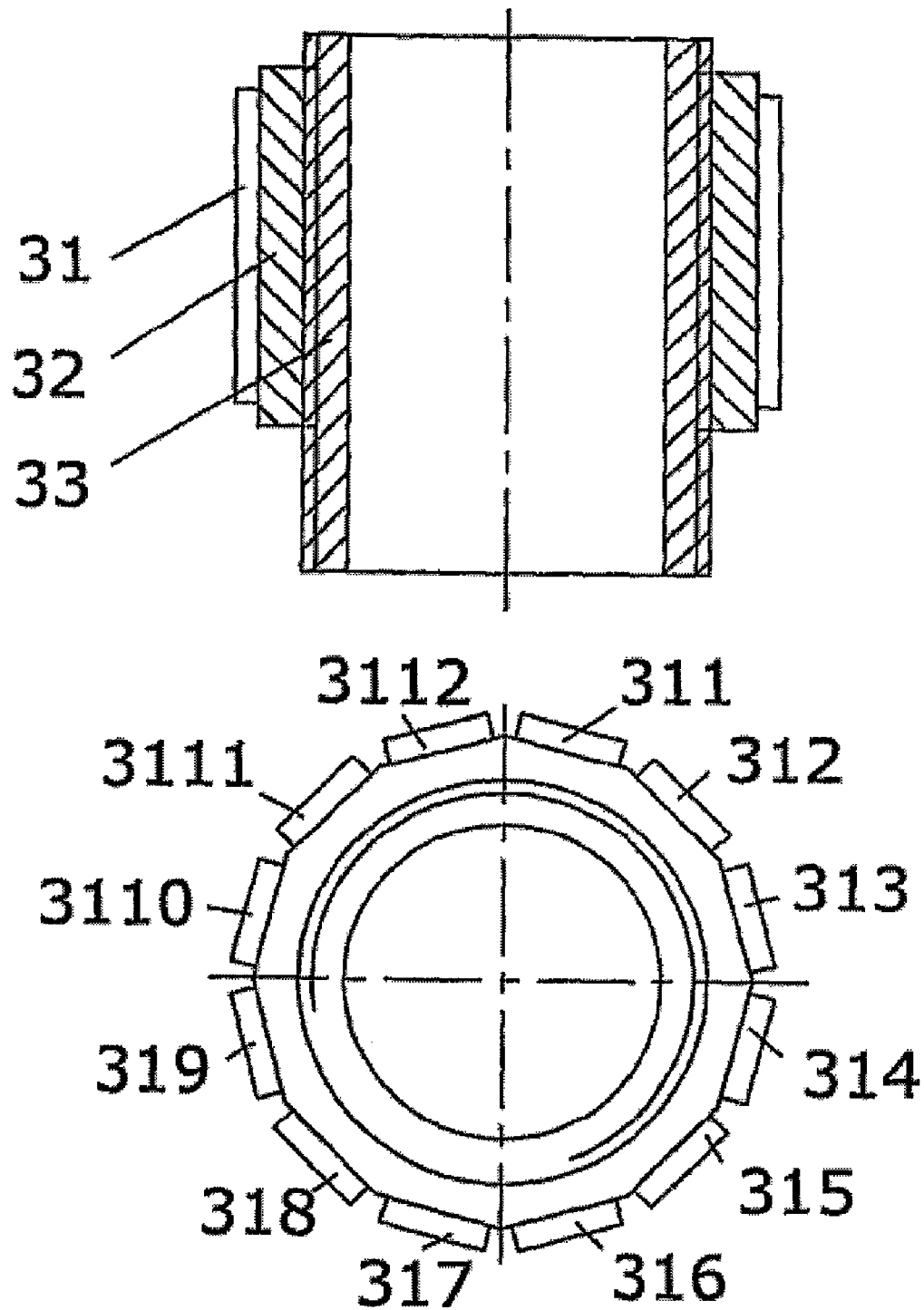
FIG. 3 is a diagram illustrating of a polyhedral tube-shaped ultrasonic motor with screw threads driving system according to the embodiment 1 of present invention.

Embodiment 1 is a screw thread driving dodecahedral tube ultrasonic motor, as shown in FIG. 3, which comprises 12 pieces of piezoelectric ceramic plates 31 that are bonded to the external surfaces of a dodecahedral tube 32 respectively to form a vibrator, the piezoelectric ceramic plates 311, 312, 313, 314, 315, 316, 317, 318, 319, 3110, 3111, 3112 are arranged in sequence. The dodecahedral tube 32 has screw threads on the internal surface thereof, a round tube 33 is placed therein, and the external surface of the round tube has external screw threads, which are matched with the screw threads on the dodecahedral tube 32. One end of the round tube 33 is immovably supported as a stator and the vibrator is used as a rotor. If the piezoelectric ceramic plates 311, 312, 315, 316, 319, 3110 are positive polarized and the piezoelectric ceramic plates 313, 314, 317, 318, 3111, 3112 are negative polarized, bending travelling waves can be generated in the rotor 32 which will move relatively to the stator 33, when the piezoelectric ceramic plates 311, 313, 315, 317, 319, 3111 are excited by signal sin ωt, and the piezoelectric ceramic plates 312, 314, 316, 318, 3110, 3112 are excited by signal cos ωt. If all of the piezoelectric ceramic plates are positive polarized, the excitation signal should be in the sequence of sin ωt, cos ωt, −sin ωt, −cos ωt.

Figure 4:
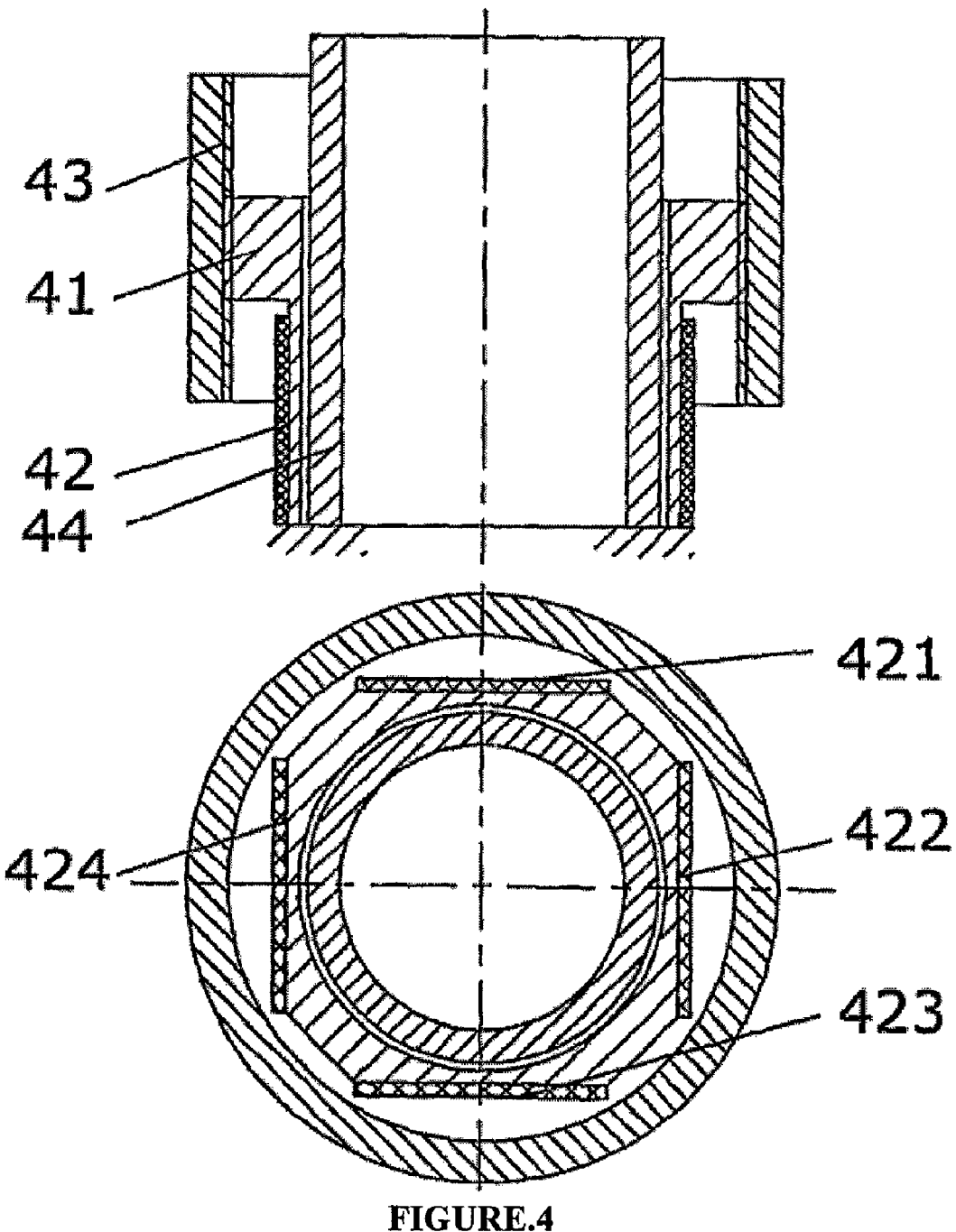
FIG. 4 is a diagram illustrating of a tetrahedron tube-shaped screw threads driving system with inner stator according to the embodiment 2 of present invention.
Figure 5:
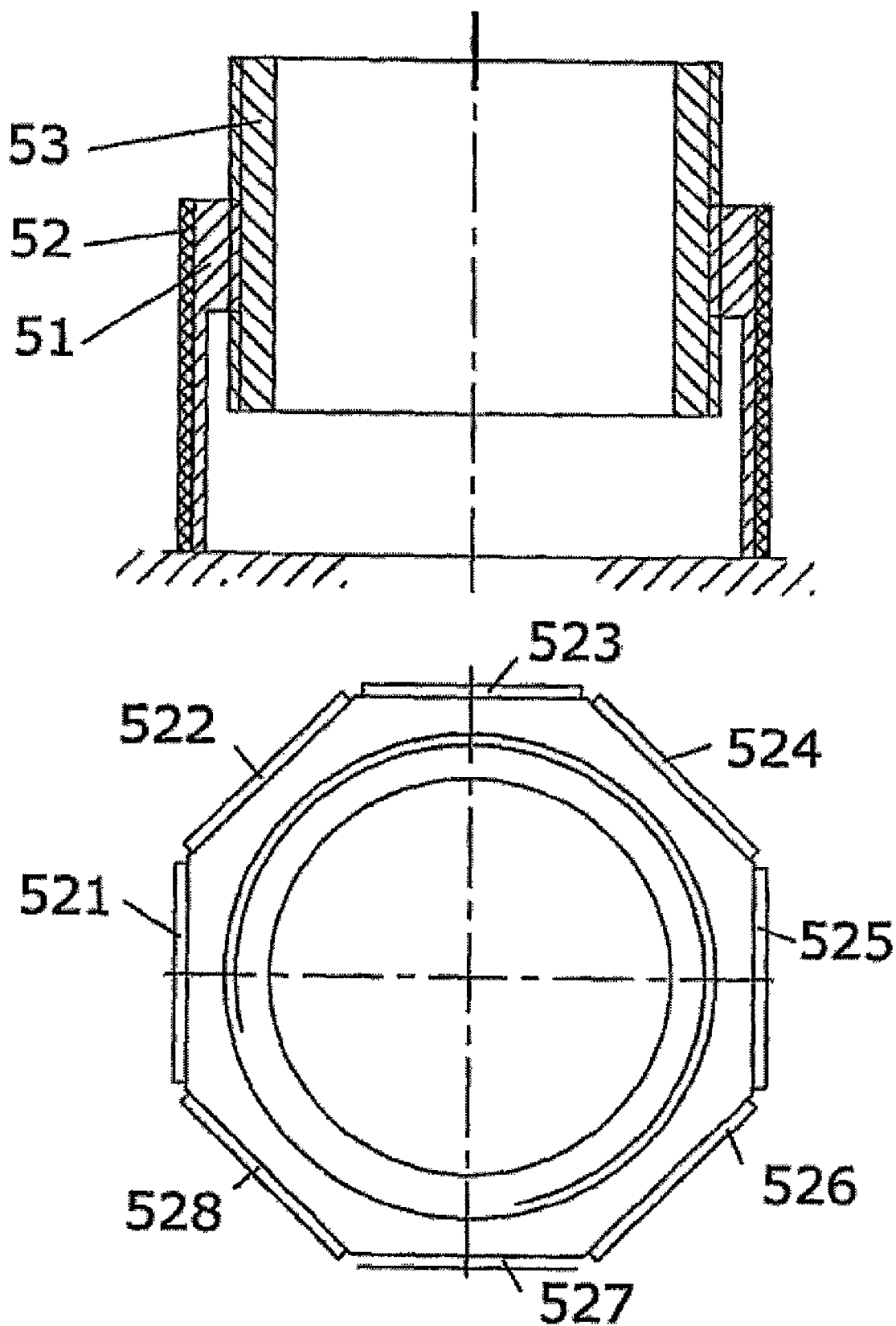
FIG. 5 is a diagram illustrating of an octahedron tube-shaped screw threads driving system with outer stator according to the embodiment 3 of present invention.

Embodiment 2 is a tetrahedral tube ultrasonic motor driven by screw thread, whose configuration is shown in FIG. 4. It comprises an inner tube shaped stator 41 comprising a convexity thereon. The convexity has external screw threads on the external surface thereof, the external surface of the lower part of the stator is tetrahedral, the piezoelectric ceramic plates 42 (totally 4 pieces: 421, 422, 423, 424) are bonded to the tetrahedron respectively so as to form a vibrator, the stator 41 is placed in an outer tube shaped rotor 43 having internal screw threads, and the internal screw threads on the rotor are matched with the external screw threads on the stator; a fixed tube 44 is placed inside the stator, the bottom of the tube 44 and the bottom of the stator are immovably supported together.

If all of the piezoelectric ceramic plates bonded to the stator are positive polarized, the bending travelling waves can be generated within the stator 41 and drive the rotor 43 to rotate and move axially when the piezoelectric ceramic plates 421, 422, 423, 424 are excited by signals sin ωt, cos ωt, −sin ωt, −cos ωt respectively. A lens module or other devices can be installed inside the tube 44.

When the piezoelectric ceramic plates 421, 422 are positive polarized and the piezoelectric ceramic plates 423, 424 are negative polarized, the motor can be driven by two signals, one for exciting the piezoelectric ceramic plates 421, 423 with signal sin ωt and the other for exciting the piezoelectric ceramic plates 422, 424 with signal cos ωt.

Embodiment 3 is an octahedral tube ultrasonic motor driven by screw threads, as shown in FIG. 4, comprising:

A outer tube stator 51, which has a convexity on the upper part of internal surface, and internal screw threads are provided on the internal surface where the convexity is formed, the bottom of the stator is immovably supported; the external surface of the stator is octahedral, the piezoelectric ceramic plates 52 (including 8 pieces: 521, 522, 523, 524, 525, 526, 527, 528) are bonded to the octahedron respectively so as to form a vibrator, an inner tube rotor 53 with external screw threads is placed in the stator 51, and the external screw threads on the rotor are matched with the internal screw threads on the stator.

If all of the piezoelectric ceramic plates bonded to the stator are positive polarized, the bending travelling waves are generated on the upper part of the stator 51 and drive the rotor 53 to rotate and move axially when the piezoelectric ceramic plates 521, 522, 523, 524, 525, 526, 527, 528 are excited by signals sin ωt, cos ωt, −sin ωt, −cos ωt, sin ωt, cos ωt, −sin ωt, −cos ωt respectively.

If the piezoelectric ceramic plates 521, 522, 525, 526 are positive polarized and the piezoelectric ceramic plates 523, 524, 527, 528 are negative polarized, the rotor 53 can be driven to rotate and move axially by two signals, one is sin ωt for the excitation of the piezoelectric ceramic plates 521, 523, 525, 527, the other is cos ωt for the excitation of the piezoelectric ceramic plates 522, 524, 526, 528; or can be other arrangement where the number of the piezoelectric plates is 1, 2, 3 or any other integer, which can generate in-plane bending travelling waves or standing waves, and the corresponding way of excitation as well.

Embodiment 4 is a screw threads driving system of an ultrasonic motor with a pre-pressure spring.

Figure 6:
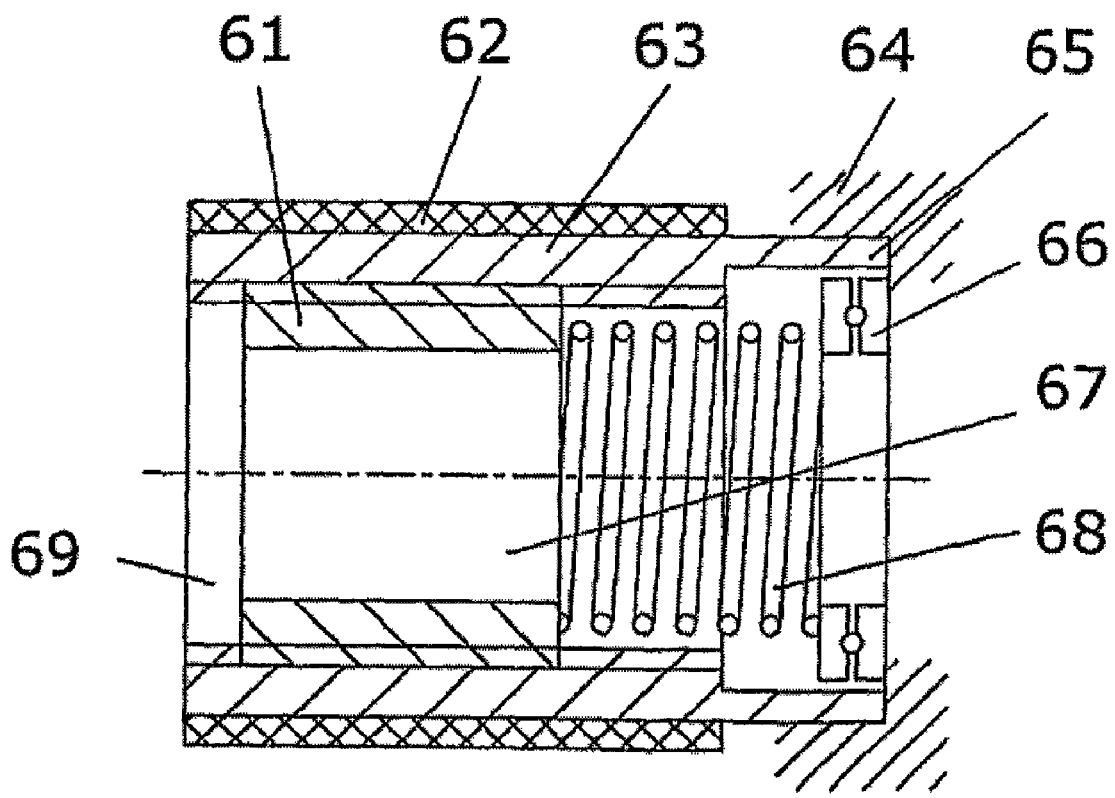
FIG. 6 is a cross-section view of the screw threads driving system of an ultrasonic motor with a pre-pressure spring according to the embodiment 4 of present invention.

The screw threads driving system of an ultrasonic motor with a pre-pressure spring of the present embodiment comprises an ultrasonic motor, a driven element embedded in the ultrasonic motor and a pre-pressure spring. As shown in FIG. 6, the ultrasonic motor comprises a rotor 61 and a stator 63, 12 pieces of piezoelectric elements 62 are bonded to the stator 63 (the piezoelectric elements 62 can be formed in the shape of a sheet, a curve sheet, a cylinder, or various polyhedral, annular tube in whole or conical tube in whole). There are screw threads being matched with each other on both the stator and the rotor, the cross section of the screw threads are formed in the shape of triangle, trapezoid, rectangle, convexity or various shapes and their combinations, the screw threads can be continuous, intermittent or a curve having a particular locus. The surfaces of the screw threads are processed to be abrasion resistant or are coated with abrasion resistant materials. The driven element can be selectively set in a cavity 69 of the stator 63 or/and a cavity 67 of the rotor 61. An isolation strip having a thin wall 65 is set on one end of the stator, one end of the isolation strip is fixed on a base 64, and the isolation strip is used for reducing the influence of the base to the stator vibration. There is an interval between common screw threads contact pairs. Furthermore, the return interval in reciprocate will affect the movement precision. Therefore, it is necessary to pre-tighten the screw threads pair. In FIG. 6, a compression spring 68 is used to exert an axial pre-pressure between the rotor 67 and the base 64, the axial pre-pressure makes the screw threads always contact with each other in the same direction so as to eliminate the return interval, and the pre-pressure also provides a way to adjust driving force of friction. A bearing 66 with steel balls is set on the base or the stator as well so as to reduce the friction force when the rotor rotates. The form of the spring can also be an elastic strip, and the form of the bearing can also be a groove holding a ball or can be a slider.

The element 66 and 68 can be replaced by two rings, both of which are magnetic, or one is magnetic and the other is ferromagnetic so as to generate a magnetic attractive force to provide the pre-pressure.

When the alternating voltage is applied to the piezoelectric elements 62, the stator 63 directly drives the rotor 61 to rotate via friction, and the rotation of the rotor 61 is transformed into the relatively axial rectilinear motion thereof via the motion transfer of screw thread, so that the driven element set on the rotor can move linearly along the axial direction. When the optical lens (group) is brought to move, it functions as optical focusing and zooming.

Embodiment 5 is a screw threads driving system of an ultrasonic motor with a rotor cap and a pre-pressure spring.

Figure 7:
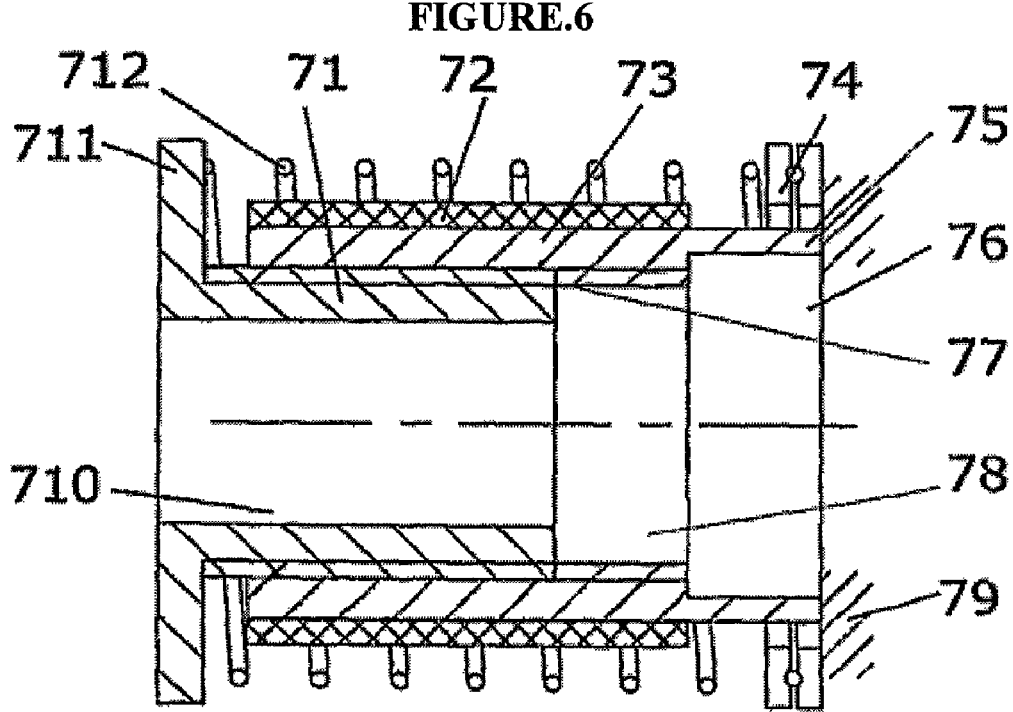
FIG. 7 is a cross-section view of the screw threads driving system of an ultrasonic motor with a rotor cap and a pre-pressure spring according to the embodiment 5 of present invention.

As shown in FIG. 7, the main differences between the present embodiment and embodiment 4 are: in the present embodiment, a pre-pressure spring 712 is positioned outside the stator 73, the spring 712 has two supporting ends, one of which is set on the rotor cap 711, and the other is set on the bearing 74. The bearing 74 can be set on the base 79, or can also be set on the stator 73 so as to reduce the return interval and the friction force when the rotor 711 rotates. The form of the spring can also be an elastic strip, and the form of the bearing can also be a groove holding a ball or can be a slider. Reference sign 77 refers to an abrasion resistant coat.

Two rings both are magnetic or one is magnetic and the other is ferromagnetic can be provided at the interval between the stator 73 and the rotor 711 so as to generate a magnetic attractive force to provide the pre-pressure.

Embodiment 6 is a screw threads driving system of a dual stator ultrasonic motor with a pre-pressure spring.

Figure 8:
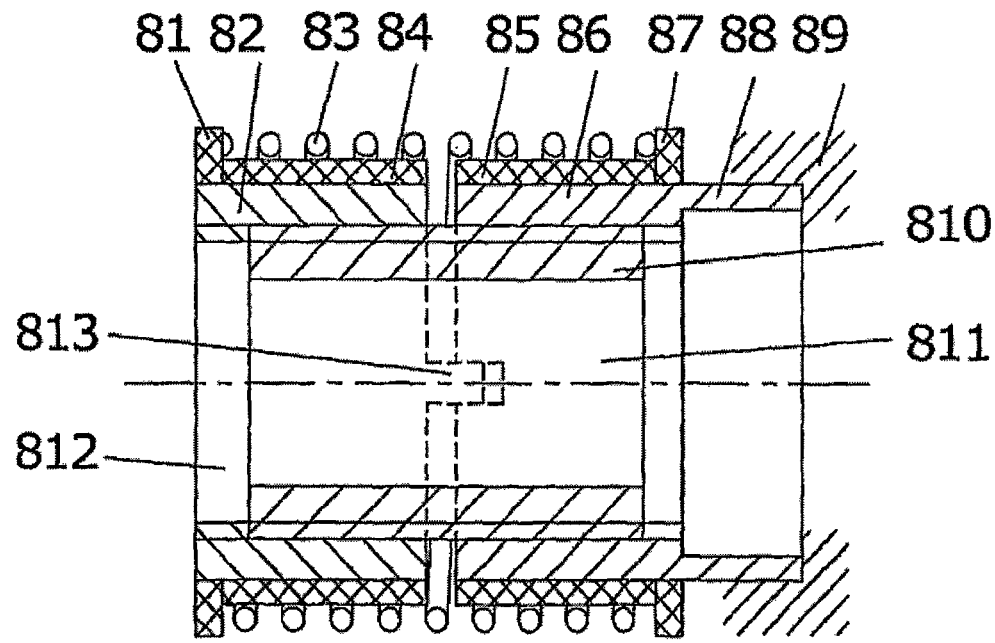
FIG. 8 is a cross-section view of the screw threads driving system of a dual stator ultrasonic motor with a pre-pressure spring according to the embodiment 6 of present invention.

As shown in FIG. 8, a double stator configuration with a pre-pressure spring 83 has been adopted in present embodiment. Stators 82 and 86 drive a rotor 810 to move simultaneously. One end of the stator 86 is fixed on a base 89 via an isolation strip 88, and a spring 83 is set between the two stators to provide a pre-pressure so as to press the screw threads of the stators and rotor with each other tightly. Blocks 81 and 87 are bonded to the stators 82, 86 so as to block the spring on its both ends. The block can be made of metal or non-metal. Two stators are anchored via a groove 813 to prevent stator 82 from rotating. When an alternating voltage is applied to the piezoelectric elements 84, 85, the stators 82 and 86 drive the rotor 810 to rotate simultaneously. The driven elements can be set on the rotor 810 to move linearly along the axial direction. If an optical lens group is brought to move, it functions as optical focusing and zooming. The optical lens group can be set in the cavity 811 of the rotor 810 and/or the cavity (such as 812) of the stator 82 so as to bring the optical lens group to move and realize optical focusing and zooming.

The other parts are the same as or similar to those described in embodiment 4 or 5 both in configuration and the method of usage, therefore it is not necessary to describe in detail.

Embodiment 7 is a screw threads driving system of a dual stator ultrasonic motor with a U-shaped pre-pressure elastic strip.

Figure 9:
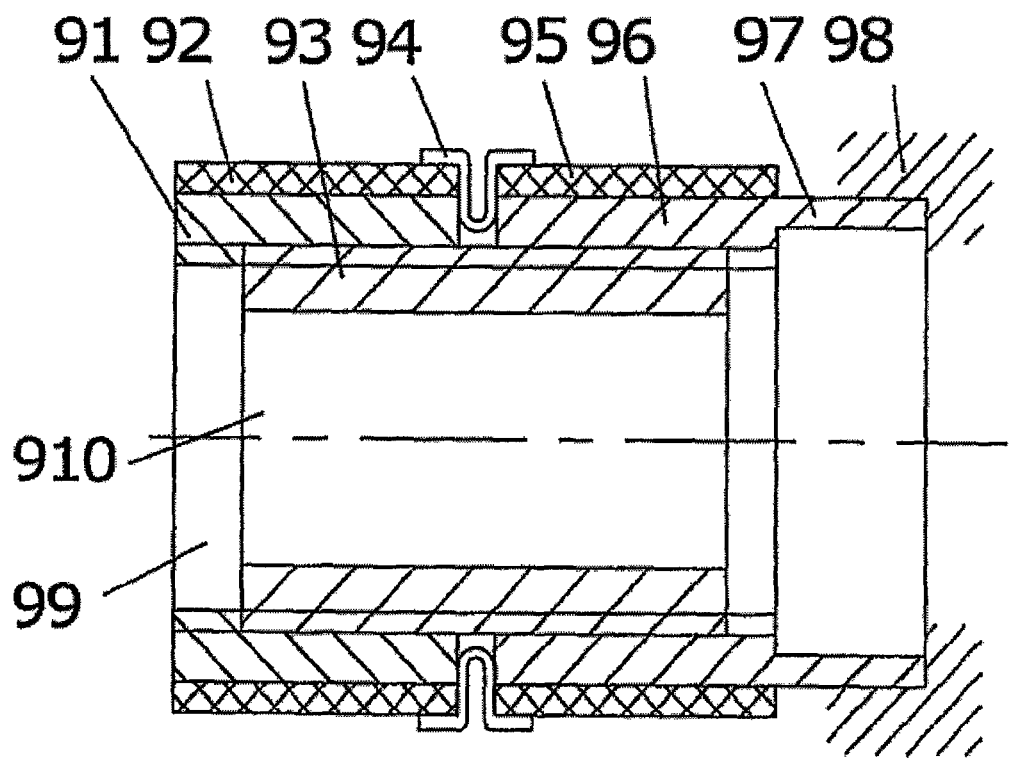
FIG. 9 is a cross-section view of the screw threads driving system of a dual stator ultrasonic motor with a U-shaped pre-pressure elastic strip according to the embodiment 7 of present invention.

As shown in FIG. 9, the main differences between present embodiment and embodiment 6 are: in present embodiment, a U-shaped pre-pressure elastic strip 94 is used to connect with two stators 91 and 96 so that the stator 91 will not rotate, but a pre-pressure is provided between the stators 91 and 96 so as to press the screw threads of the stators 91 and 96 and the rotor 93 with each other tightly.

The other parts are the same as or similar to those described in embodiment 4 or 5 in both configurations and the method of usage, therefore it is not necessary to describe in detail.

Embodiment 8 is a screw threads driving system of a dual rotor ultrasonic motor with a pre-pressure spring.

Figure 10:
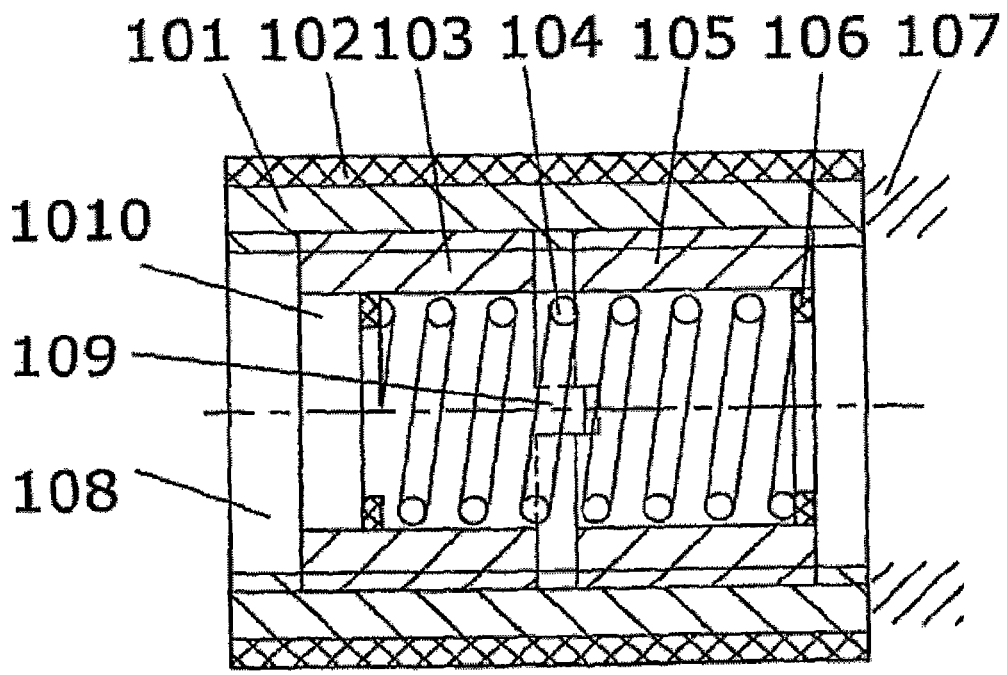
FIG. 10 is a cross-section view of the screw threads driving system of a dual rotor ultrasonic motor with a pre-pressure spring according to the embodiment 8 of present invention.

As shown in FIG. 10, a dual rotor configuration with a pre-pressure spring 104 is adopted in present embodiment. Two rotors 103 and 105 are used in the present embodiment, where a spring 104 provides a pre-pressure between the two rotors 103 and 105 so as to press the screw threads of the stator 101 and rotors 103 and 105 with each other tightly. Two rotors 103 and 105 are anchored via a groove 109 to prevent relative rotation, and a stator 101 drive rotors 103 and 105 to rotate simultaneously. One end or the stator 101 is fixed directly on a base 107; or the stator 101 can also be fixed on a base via an isolation strip used in the embodiment 5. The driven elements set on the rotors 103 and 105 can move linearly along the axial direction. If an optical lens group is installed in the cavity 1010 of the rotor 103 and/or the cavity (such as 108) of the stator, the rotors 103 and 105 will rotate simultaneously so as to bring the optical lens group to move to realize optical zooming and focusing when the alternating voltage is applied to the piezoelectric element 102.

Alternatively, two rings both of which are magnetic or one is magnetic and the other is ferromagnetic can be positioned between the two rotors so as to generate a magnetic attractive force and provide a pre-pressure.

Embodiment 9 is a screw threads driving system of a dual rotor ultrasonic motor with a U-shaped pre-pressure elastic strip.

Figure 11:
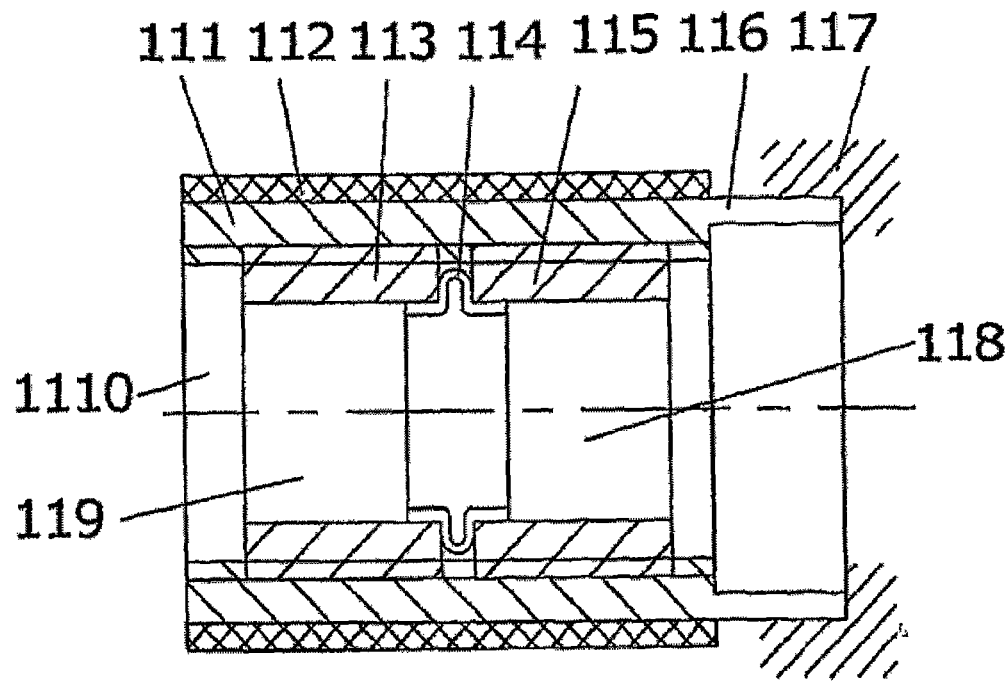
FIG. 11 is a cross-section view of the screw threads driving system of a dual rotor ultrasonic motor with a U-shaped pre-pressure elastic strip according to the embodiment 9 of present invention.

As shown in FIG. 11, the main differences between present embodiment and embodiment 8 are: in present embodiment, a U-shaped pre-pressure elastic strip 114 is used to connect with two rotors 113 and 115 to prevent them from rotating relatively. And a pre-pressure is provided between the rotators 113 and 115 so as to press the screw threads of the stator 111 and rotors 113 and 115 with each other tightly.

Alternatively, two rings both of which are magnetic or one is magnetic and the other is ferromagnetic can be adopted between the two rotors so as to generate a magnetic attractive force to provide a pre-pressure.

The other parts are the same as or similar to those described in embodiment 8 in both configuration and the method of usage, therefore it is not necessary to describe in detail.

Embodiment 10 is a screw thread driving system of a dual rotor ultrasonic motor with magnetic rings.

Figure 12:
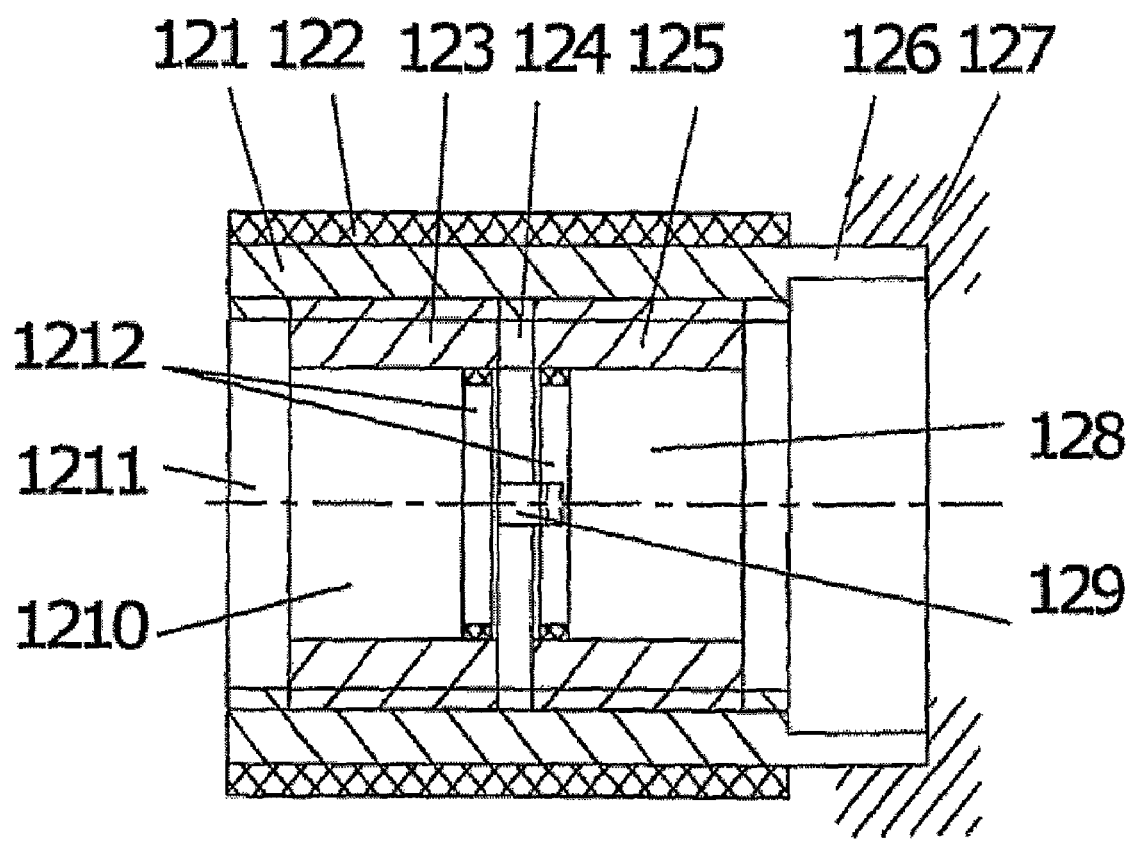
FIG. 12 is a cross-section view of the screw threads driving system of a dual rotor ultrasonic motor with a magnetic ring according to the embodiment 10 of present invention.

As shown in FIG. 12, the main differences between present embodiment and embodiment 8 are: in present embodiment, two magnetic rings 1212 are adopted to provide pre-pressure between rotors 123 and 125 to press the screw threads of the stator and rotors 123 and 125 with each other tightly. Meanwhile, a groove 129 is used to connect with two rotors 123 and 125 to prevent them from rotating relatively. The two magnetic rings 1212 can be replaced by a magnetic one and a ferromagnetic one. And the magnetic rings 1212 can also be set between a rotor 123 or 125 and a base (or a stator 121) or between two (multiple) stators.

The other parts are the same as or similar to those described in embodiment 8 in both configuration and the method of usage, therefore it is not necessary to describe in detail.

Figure 13:
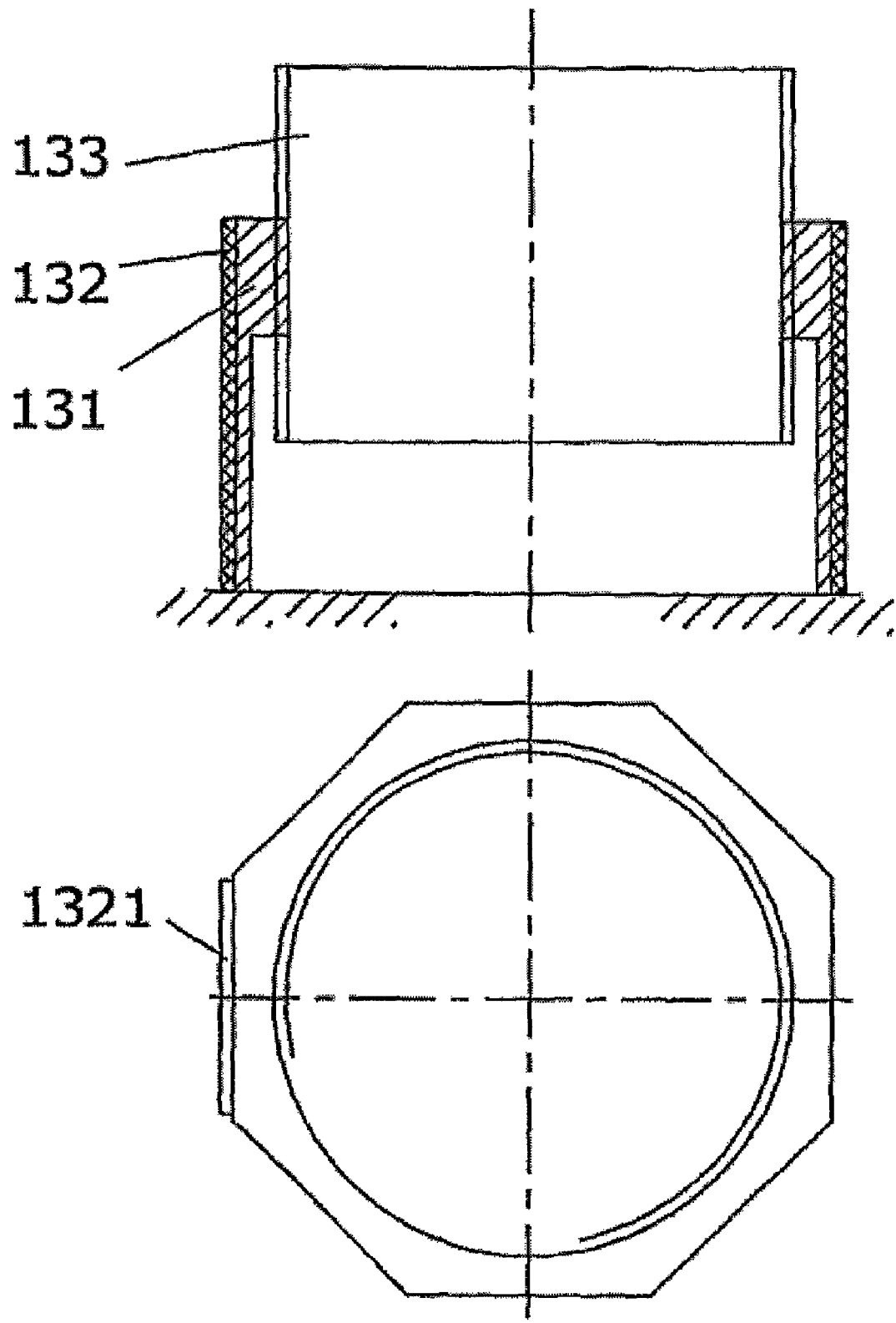
FIG. 13 is a schematic diagram of screw threads driving configuration of a standing wave ultrasonic motor excited by single piezoelectric plate according to the embodiment 11 of present invention.

Embodiment 11 as shown in FIG. 13, is a rotor 133 is solid, only one piezoelectric ceramic plate 1321 (two or three and multiple of two or three piezoelectric ceramic plate can be also used) is bonded to a stator 131. A single-phase signal voltage excites the stator 131 to generate an in-plane bending standing wave, the bending standing wave drives the rotor 133 to rotate and move linearly via the friction caused by the contact of the screw threads between the stator 131 and the rotor 133. The stator 131 or the rotor 133 can also be single, dual or multiple, and a pre-pressure can be exerted thereon as embodiments 4-10. The rotor 133 can drive a micro-positioner or a micro-pump.

According to the embodiments above, by using a single rotor 133 and a single stator 131 or dual rotors or dual stators configuration, and by providing a pre-pressure via a spring, a U-shaped elastic strip or magnetic elements, the screw threads between the stator 131 and the rotor 133 can be pressed tightly to eliminate the return interval and to increase the driving force, so as to produce relative motion of the stator 131 and the rotor 133 along axial direction, and the driven component placed on the rotor 133 can be brought to move rectilinearly along the axial direction. By moving the optical lens group, optical zooming and focusing is realized. And by changing the distance between the optical lens (group) and imaging element, simple or compound optical zooming and focusing can be realized.

A pre-pressure can also be provided by staggering the dual stators (or the dual rotors) by a small angle and bonding them together coaxially so as to pre-tighten the screw thread pair.

The methods of exerting a pre-pressure can also be applied to an optical zooming/focusing system via the screw thread driving of an ultrasonic motor with multiple stators and multiple rotors in an integrated configuration.

The invention claimed is:

1. A screw thread driving polyhedral ultrasonic motor, comprising a stator, a rotor and a polyhedron formed by integrating piezoelectric elements with the stator or the rotor, said ultrasonic motor has a polyhedron like shape, characterized in that, in-plane bending travelling waves or standing waves around the circle of the polyhedron can be excited in the stator or the rotor, and screw threads matching each other are provided on the contacting surface between the stator and the rotor.

2. The screw thread driving polyhedral ultrasonic motor as claimed in claim 1, characterized in that, said rotor comprises piezoelectric elements being bonded to surfaces of the polyhedron, said rotor has internal screw threads on the internal surfaces thereof, and in-plane bending travelling waves along the polyhedron are excited in said rotor; and the corresponding stator is placed inside said rotor with internal screw threads, the stator has external screw threads on external surface thereof, which are matched with the internal screw threads on the rotor.

3. The screw thread driving polyhedral ultrasonic motor as claimed in claim 1, characterized in that, said stator is a tube with an outward convexity on part of the external surfaces, the outward convexity has external screw threads on the external surfaces, the other part of the external surfaces of the stator is polyhedral, the stator of the ultrasonic motor is formed by bonding said piezoelectric elements to surfaces of the polyhedral stator, in-plane bending travelling waves along the polyhedron are excited in the stator, said rotor is a tube with internal screw threads, which is installed outside said convexity of the stator, the internal screw threads on the rotor are matched with the external screw threads on the convexity of the stator; wherein an inner tube is placed inside the stator and the bottoms of the inner tube and the stator are immovably supported together.

4. The screw thread driving polyhedral ultrasonic motor as claimed in claim 1, characterized in that, said stator is a tube with an inward convexity on part of the internal surfaces, the inward convexity has internal screw threads on its internal surfaces, the stator is formed by bonding said piezoelectric elements to surfaces of the polyhedron, said rotor is a tube with external screw threads, which is placed inside the stator, the external screw threads of the rotor is matched with the internal screw threads on the convexity of the stator.

5. The screw thread driving polyhedral ultrasonic motor as claimed in claim 1, characterized in that, said stator is formed by bonding piezoelectric elements to surfaces of the polyhedron, said stator has internal screw threads on its internal surfaces, in-plane bending travelling waves are excited in said stator; and the corresponding rotor is placed inside said stator with internal screw threads, the rotor has external screw threads on its external surfaces, which are matched with the screw threads on the stator.

6. The screw thread driving polyhedral ultrasonic motor as claimed in claim 1, 2, 3, 4 or 5, characterized in that, the number of said piezoelectric elements is 1, 2, 3, 4, or any other integer, which can excite in-plane bending travelling waves or standing waves, said piezoelectric elements are formed in the shape of flat slice, curve slice or cylinder, or various polyhedral, annular tube in whole or conical tube in whole.

7. The screw thread driving polyhedral ultrasonic motor as claimed in claim 1, 2, 3, 4 or 5, characterized in that, said stator has single, dual or multiple stator configuration, a pre-pressure is provided by one or more springs, U-shaped elastic strips or magnetic elements, so as to press the screw threads of the stators and the rotor tightly with each other; and at least a portion of the screw threads have a cross section that is formed in the shape of triangle, trapezoid, rectangle, convexity or their combinations; the screw threads can be a continuous or intermittent curve, or a curve with particular locus; and the surfaces of the screw threads are processed to be abrasion resistant or are coated with abrasion resistant materials.

8. The screw thread driving polyhedral ultrasonic motor as claimed in claim 7, characterized in that, one end of the stator which is chosen from said single, dual or multiple stators is fixed on a base via a vibration isolation strip that has a thin wall, or is directly fixed on a base.

9. The screw thread driving polyhedral ultrasonic motor as claimed in claim 1, 2, 3, 4 or 5, characterized in that, said rotors have dual or multiple rotor configuration, a pre-pressure is provided via springs, U-shaped elastic strips or magnetic elements so as to press the screw threads of the stator and the rotors tightly with each other; and the rotors are either solid or hollow.

10. The screw thread driving polyhedral ultrasonic motor as claimed in claim 1, 2, 3, 4 or 5, characterized in that, said rotor has dual or multiple rotor configuration, said stator has dual or multiple stator configuration, a pre-pressure is provided by staggering the dual stators or the dual rotors by a small angle and bonding them together coaxially so as to pre-tighten the screw threads pair of the stators and the rotors.

11. The screw thread driving polyhedral ultrasonic motor as claimed in claim 6, characterized in that, the number of said piezoelectric elements is 6, 8, or 12.

* * * * *